United States Patent
Jing et al.

(10) Patent No.: US 8,832,567 B1
(45) Date of Patent: Sep. 9, 2014

(54) USING VISUALIZATION TECHNIQUES FOR ADJUSTMENT OF PRIVACY SETTINGS IN SOCIAL NETWORKS

(75) Inventors: Yushi Jing, San Francisco, CA (US); Richard C. Gossweiler, III, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 13/397,095

(22) Filed: Feb. 15, 2012

(51) Int. Cl.
   *G06F 3/00* (2006.01)
(52) U.S. Cl.
   USPC ........... 715/753; 715/738; 715/747; 715/769; 726/1; 726/28
(58) Field of Classification Search
   USPC .................. 715/753, 738, 769; 726/28, 1
   See application file for complete search history.

(56) References Cited

U.S. PATENT DOCUMENTS

| | | | |
|---|---|---|---|
| 6,484,149 B1 * | 11/2002 | Jammes et al. ............ 705/26.62 |
| 6,614,929 B1 * | 9/2003 | Yokota ........................... 382/175 |
| 8,229,116 B2 * | 7/2012 | Ogata ........................... 380/201 |
| 2005/0198131 A1 * | 9/2005 | Appelman et al. ............ 709/204 |
| 2008/0235609 A1 * | 9/2008 | Carraher et al. .............. 715/769 |
| 2010/0024028 A1 * | 1/2010 | Baugher et al. ................. 726/17 |
| 2010/0100824 A1 * | 4/2010 | Bartolini et al. .............. 715/738 |
| 2010/0145947 A1 * | 6/2010 | Kolman et al. ............... 707/736 |
| 2011/0197263 A1 * | 8/2011 | Stinson, III ....................... 726/4 |
| 2012/0110052 A1 | 5/2012 | Smarr et al. |
| 2012/0215878 A1 * | 8/2012 | Kidron .......................... 709/213 |
| 2012/0227115 A1 * | 9/2012 | Kidron ............................ 726/30 |
| 2012/0311657 A1 * | 12/2012 | Boldyrev et al. ................. 726/1 |
| 2013/0014279 A1 * | 1/2013 | Leland ............................ 726/28 |

* cited by examiner

*Primary Examiner* — Kyle Stork
*Assistant Examiner* — Mario M Velez-Lopez
(74) *Attorney, Agent, or Firm* — Procopio, Cory, Hargreaves & Savitch LLP (57) ABSTRACT

Establishing privacy settings associated with user data shared by a user of a social networking service can include transmitting instructions to display a graphical user interface (GUI) that includes two or more privacy zones, a first privacy zone that is representative of a first set of privacy settings, and a second privacy zone that is representative of a second set of privacy settings. The GUI can include a privacy setting icon that is representative of one or more social entities. User input can be received and to define placement of the privacy setting icon within one of the first and second privacy zones. In response to placement of the privacy setting icon, one of the first set of privacy settings and the second set of privacy settings are assigned to the one or more social entities represented by the privacy setting icon.

16 Claims, 6 Drawing Sheets

USING VISUALIZATION TECHNIQUES FOR ADJUSTMENT OF PRIVACY SETTINGS IN SOCIAL NETWORKS

TECHNICAL FIELD

This specification generally relates to computer software systems and methods, in particular, systems and methods for privacy settings associated with user data shared by users in a social networking service.

BACKGROUND

Internet-based social networking services provide a digital medium for users to interact with one another and share information. For example, users are able to share digital content (e.g., textual comments, digital images, digital videos, digital audio, hyperlinks to websites, etc.) with other users that are connected within the social networking service. For example, a user might share digital content with other users by posting the content to a profile page hosted by a social networking service. Privacy settings can be used to determine which users of the social networking service are allowed to access shared digital content.

SUMMARY

In general, innovative aspects of the subject matter described in this disclosure may be embodied in methods that include the actions of transmitting, using one or more computing devices, instructions to display a graphical user interface (GUI), the GUI including: two or more privacy zones, where the two or more privacy zones include a first privacy zone provided as a graphical representation of a first set of privacy settings and a second privacy zone as a graphical representation of a second set of privacy settings, and a first privacy setting icon as a graphical representation of a first grouping of social entities, the first grouping of social entities including one or more contacts within a social networking service. The methods further include the actions of receiving, at the one or more computing devices, first user input, the first user input defining a location of the first privacy setting icon within at least one of the first and second privacy zones, and in response to the location of the first privacy setting icon within the at least one of the first and second privacy zones, controlling, using the one or more computing devices, access of the one or more contacts of the first grouping of social entities to digital content based on at least one of the first and second sets of privacy settings. Other implementations of these aspects include corresponding systems, apparatus, and computer programs, configured to perform the actions of the methods, encoded on computer storage devices.

These and other implementations may each optionally include one or more of the following features: where privacy settings of the first set of privacy settings are different from privacy settings of the second set of privacy settings; where each privacy setting of the first set of privacy settings and the second set of privacy settings is associated with a category of digital content; where the digital content includes digital content associated with a user of the social networking service; where the user input is provided by the user; where the two or more privacy zones include three or more privacy zones graphically representing three distinct sets of privacy settings, respectively; where the first set of privacy settings is less restrictive than the second set of privacy settings; where the first set of privacy settings and the second set of privacy settings are associated with a plurality of digital content categories; where a spatial relationship between the first privacy zone and the second privacy zone corresponds to a relative restrictiveness between the first set of privacy settings and the second set of privacy settings; where a size relationship between the first privacy zone and the second privacy zone corresponds to a relative restrictiveness between the first set of privacy settings and the second set of privacy settings; and where controlling access of the one or more contacts to digital content based on at least one of the first and second privacy settings includes generating at least one access control list (ACL) relating to the digital content. Further, in some implementations, the methods further include the actions of transmitting instructions to display a second privacy setting icon as a graphical representation of a second grouping of social entities, the second grouping of social entities including one or more contacts within the social networking service, receiving second user input, the second user input defining a location of the second privacy setting icon within at least one of the first and second privacy zones, and in response to the location of the second privacy setting icon within the at least one of the first and second privacy zones, controlling access of the one or more contacts of the second grouping of social entities to digital content based on at least one of the first and second sets of privacy settings.

Implementations of the present disclosure provide one or more of the following example advantages. Implementations provide intuitive methods and user interfaces for monitoring and adjusting privacy settings in a social networking environment.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 depicts a screen-shot of an example web page including an activity stream for a user of a social networking service.

DETAILED DESCRIPTION

1. Introduction

In general, various implementations of the present disclosure are directed to establishing privacy settings for user data shared by a user of a social networking service. In particular, implementations of the present disclosure can include transmitting instructions (for example, to a client computing device) to display a graphical user interface (GUI). In some examples, the GUI includes two or more privacy zones, a first privacy zone that is representative of a first set of privacy settings, a second privacy zone that is representative of a second set of privacy settings. The GUI also includes a privacy setting icon that is representative of one or more social entities. The one or more social entities can include, for example, user-defined groupings of contacts within the social networking service, the contacts each being socially connected with the user. User input can be received and can define placement of the privacy setting icon within one of the first and second privacy zones. In response to placement of the privacy setting icon within one of the first and second privacy zones, one of the first set of privacy settings and the second set of privacy settings are assigned to the one or more social entities represented by the privacy setting icon. In some implementations, a third set of privacy settings can be determined and can be applied to the one or more social entities. The third set of privacy settings can be applied based on placement of the privacy setting icon within a third privacy zone.

2. Example Social Networking Service

For purposes of illustration, implementations of the present disclosure are described within the context of an example social networking service. The example social networking service enables users to organize contacts into social circles. It is appreciated, however, that implementations of the present disclosure can be used in other types of social networking services and are not limited to social networking services that include social circles.

In general, social circles are categories to which a user can assign contacts and better control the distribution and visibility of social networking items distributed using the social networking service. In some implementations, a social circle can be provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries (e.g., members of the social circle might be familiar with one another) and permission may be required for a member to join a social circle. A user of the social networking service can define a social circle. The social circle, as a data set defining a collection of contacts, may reflect real-life social connections and/or interactions of the user. In some implementations, a social circle can be defined by a user as a personal representation or grouping of a set of contacts, the contacts may be unaware of the social circle and/or unaware of other members of the social circle.

Through the creation and use of social circles, the user can organize and categorize social networking contacts into various different groupings that can be used to control the visibility and access those contacts have to the items of digital content, such as text, digital images, videos, audio files, hyperlinks (e.g., uniform resource indicators, URIs), and/or other appropriate digital content distributed by the user or associated with the user's social networking profile. As one example, the user can distribute an item including an update about a work-related nuance to only a "coworker" circle, and spare other contacts within the social networking service from seeing information that is irrelevant to them.

Example System

Figure 1:
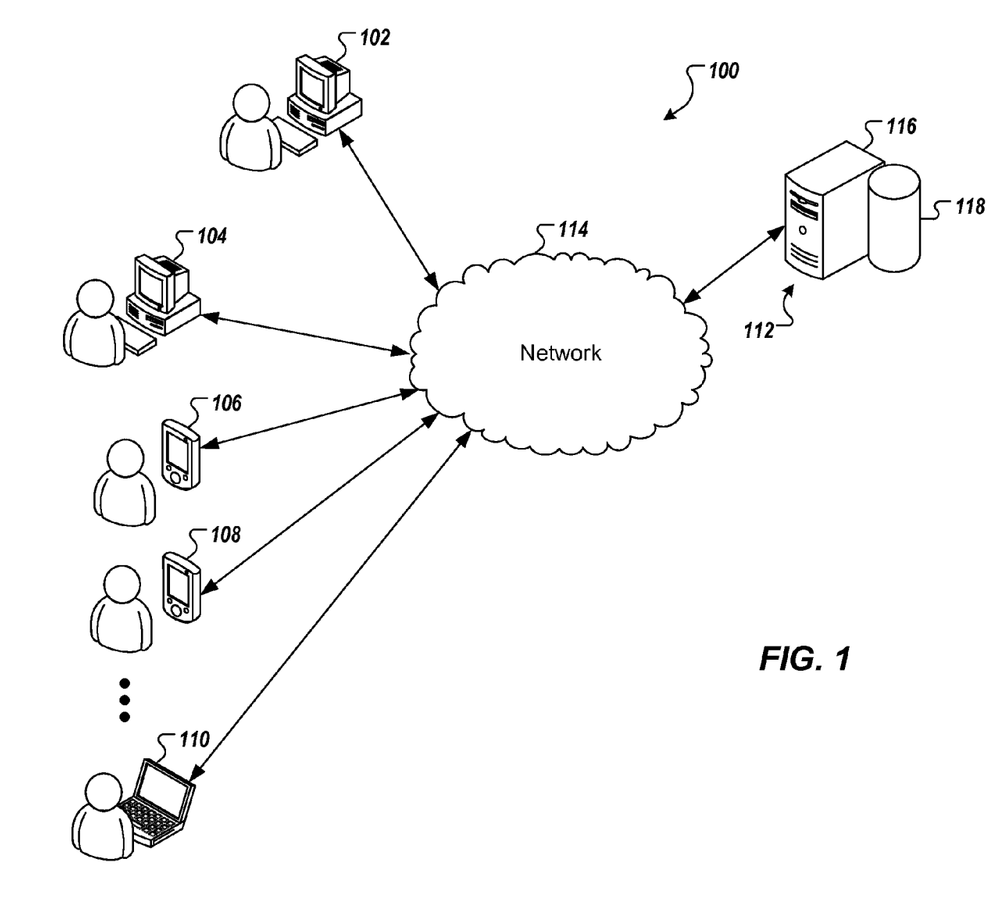
FIG. 1 is a diagram of an example network architecture.

FIG. 1 is a diagram of an example network architecture 100. The network architecture 100 includes a number of client devices 102-110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102-110 access the server device 112 to participate in a social networking service. For example, the client devices 102-110 can execute web browser applications that can be used to access the social networking service and/or an IM service. In another example, the client devices 102-110 can execute software applications that are specific to the social networking service and/or the IM service (e.g., social networking and/or IM "apps" running on smartphones).

Users interacting with the client devices 102-110 can participate in the social networking service provided by the server system 112 by sharing digital content, such as text comments (e.g., updates, announcements, replies), digital images, videos, audio files, and/or other appropriate digital content with other participants of the social networking service. In some implementations, information can be shared on a user's behalf by systems and/or services external to the social networking service or the server system 112. For example, a user can distribute an item including a review of a movie to a movie review website, and with proper permissions that website can cross-post the review to the social networking service on the user's behalf. In another example, a software application executing on a mobile device, with proper permissions, can use global positioning system (GPS) capabilities to determine the user's location and automatically update the social network with his location (e.g., "At Home", "At Work", "In Brownsdale, Minn."). Generally, users interacting with the client device 102-110 can also use the social networking service provided by the server system 112 to define social circles to organize and categorize the user's relationships to other users of the social networking service. Examples of the creation and use of social circles are provided in the description of FIG. 2.

In some implementations, the client devices 102-110 can be provided as computing devices such as laptop or desktop computers, smartphones, personal digital assistants, portable media players, tablet computers, televisions with one or more processors embedded therein or coupled thereto, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Example Social Network

Figure 2:
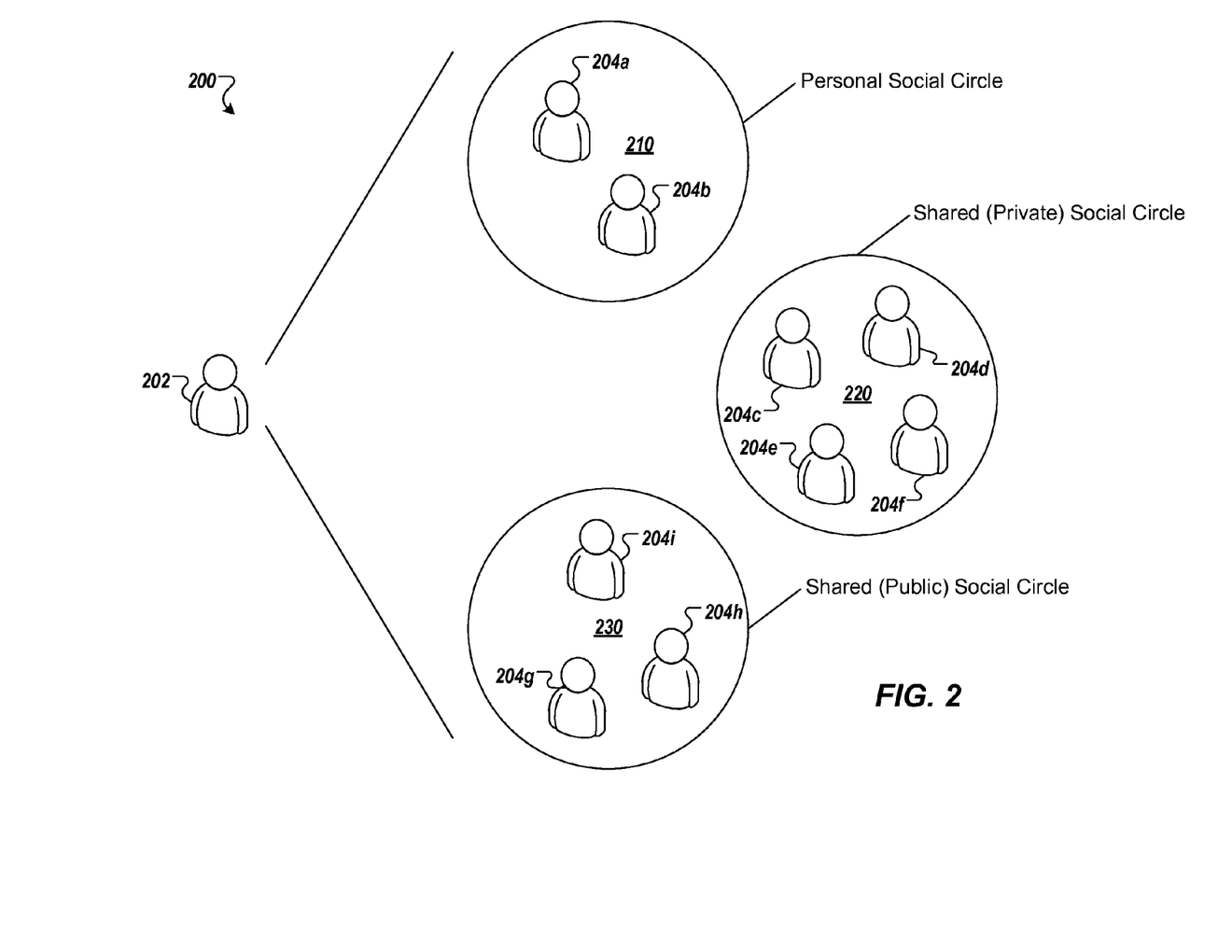
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230. In some implementations, social circles can be generated automatically without input from user 202. In some examples, a single contact can be assigned to two or more social circles.

The social circle 210 is a personal circle. In some implementations, personal circles are groupings created by and might be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal circles can be used to organize and categorize the contacts 204a-204i in ways that are relevant to the user 202. In some implementations, the user 202 may use personal social circles to organize contacts in order to discretely target which of his contacts 204a-204i will see certain items or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected items to the friends attending and/or helping to plan the surprise party (i.e., Surprise Party Attendees), while targeting selected items to friends that are to be honored at the surprise party (i.e., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can distribute information to be shared with other members of the shared private circle. For example, the user 202 may tend to distribute a large number of jokes to the social network. However, while some of the contacts 204a-204i may find the jokes to be entertaining, others may find them to be simply annoying. Realizing this, the user 202 may create a "jokes" shared private circle and invite some or all of the contacts 204a-204i to join. With the "jokes" social circle in place, the user 202 may distribute witticisms to the "jokes" circle, and only those contacts who have accepted the invitation are able to see the comicality of the user 202. Similarly, members of the shared private circle are able to distribute messages to the circle, and those messages are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may distribute information to, and see updates distributed by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act can join the circle to discuss upcoming shows, download MP3s of the band's music, or post videos from recent concerts. In another example, the user 202 can create a shared public circle for alumni of his high school graduating class, which his former classmates may find and join in order to stay in touch with one another and distribute pictures from their school days. Once a shared public circle is created, in some implementations, the user 202 can invite people to join the circle. In some implementations, nonmembers of the circle can request membership in the shared public circle, and membership in a shared public circle may be automatic upon request, or may require the user's 202 approval to become members of the shared public circle.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it can be left to the user to actually populate the default social circles with contacts. For example, each of the default social circles can initially be empty of contacts, and the user populates each of the default social circles as discussed in further detail herein.

In some examples, digital content can be distributed using the social networking service, such that it is publicly available to all users of the Internet. In some examples, digital content can be distributed to all users of the social networking service, such that it is accessible by any user of the social networking service. In some examples, digital content can be distributed to contacts within the social networking service including one or more social circles, such that they are exclusively viewable by the indicated contacts and/or contacts within one or more indicated social circles. For example, a user of the social networking service can generate an item including digital content and indicate one or more social circles for distribution of the item. In some implementations, an auto-complete component enables the user to type in part of the name of a social circle and/or individual contact to specify which social circles and/or individual contacts require delivery of the item content. During an item write-time, an item data set is transmitted from the user's client computing device (e.g., client device 102 of FIG. 1) to a distribution hub, which can be provided at a server (e.g., server system 112 of FIG. 1). The item data set includes a plurality of data. In some implementations, the item data set includes item content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the item data set upon generation of the item).

In some implementations, and as discussed in further detail herein, other data can be appended to item data sets. Example other data can be spam indication data and scoring data. In some examples, spam indication data can be appended to an item data set to indicate that the item data set is considered to be spam. In some examples, scoring data can include a social affinity score among other possible scoring data.

In some implementations, the distribution data is processed to provide an access control list (ACL) that specifies which users are granted access to the item content. In some examples, the users include users of the social networking service. In some examples, the users include users of the Internet.

Generally, the distribution hub determines end points the item data set is to be distributed to based on the ACL. More specifically, the set of contacts that may care about the item and/or that are allowed access to the item is determined based on the ACL, and the ID of the item is written to a per user/view index at the distribution hub. When fetching items to distribute to a user, the user/view index is accessed and the IDs of the various item that the user is allowed to view are determined. The item data sets are retrieved from a data store (e.g., data store 118 of FIG. 1) and are transmitted to a client device associated with the requesting user. In some implementations, and as discussed in further detail herein, the ACL can be provided based on the overall score, the quality score and/or the social affinity score.

Example User Interfaces

Figure 3:
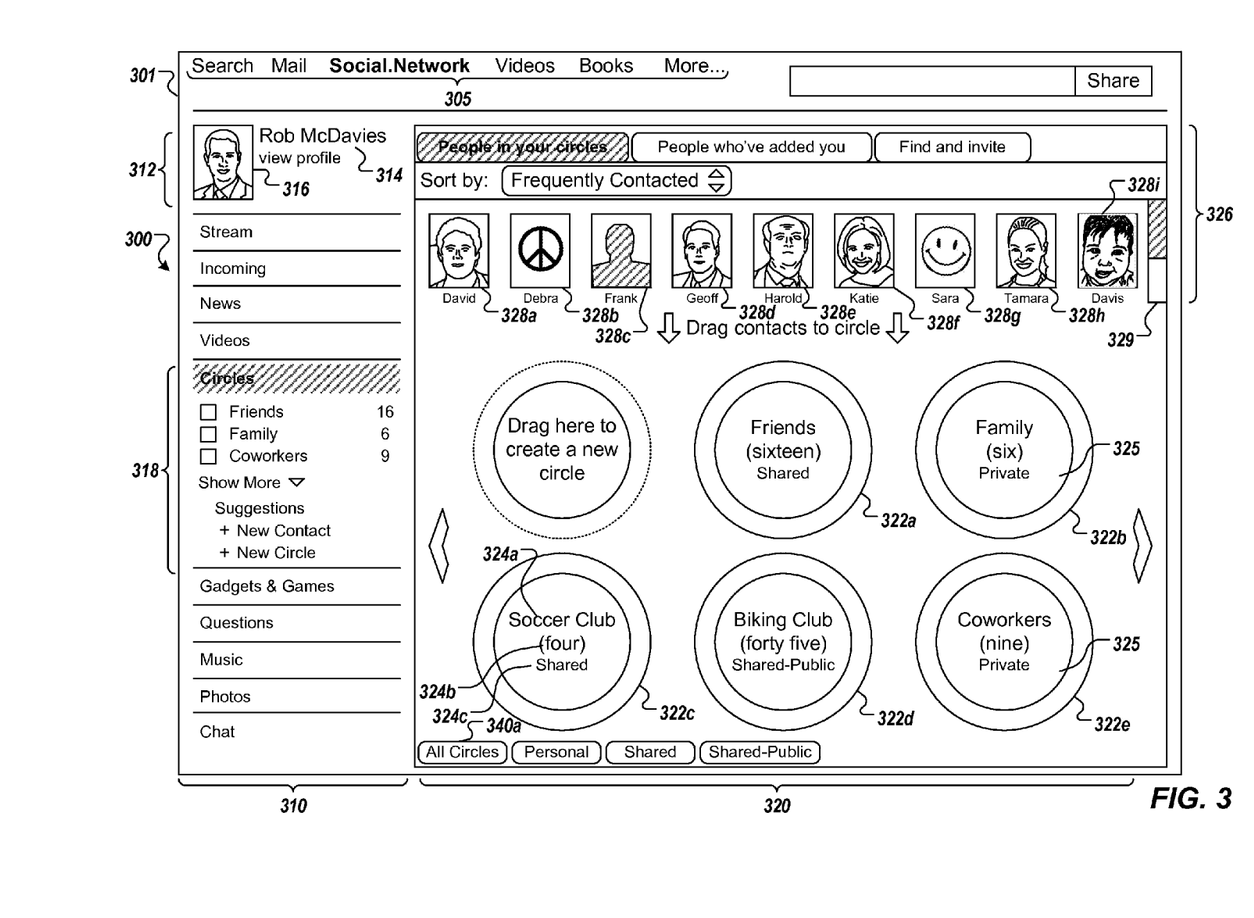
FIG. 3 depicts a screen-shot of an example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

In the example of FIG. 3, the UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles submenu 318, when selected (e.g., as represented by the highlighting of the submenu's title), causes a social circle display 320 to be presented. The social circle display 320 includes a number of circles 322a-322e that are visual representations of various social circles that the user has created or has permission to edit. Each of the circles 322a-322e displays information about the social circle it represents. For example, the circle 322c displays a name 324a, a count 324b of the number of contacts associated with the social circle, and an indication 324c of what kind of circle (e.g., personal, private shared, public shared) that the circle 322c is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). In some implementations, the icons can include additional information, such as the names of each contact. A scroll bar 329 is provided for the user to view additional contact icons that may not fit into the initial view.

FIG. 4 depicts a screen-shot of an example web page 400 including an activity stream 404 for a user of a social networking service. For example, the web page 400 can be provided as a web page within a website of a social networking service, and can display items of digital content that have been shared with a user associated with the web page 400. In the illustrated example, the example user is "Rob McDavies" and the web page 400 displays items of digital content that other users have shared with the user and/or items that the user has shared with other users. The web page 400 includes a social network menu 402 and the activity stream 404. As used herein, the term activity stream can include a graphically displayable collection of items that have been distributed to and/or from, or are otherwise accessible by a user of a social networking service. Example items 406, 408 that have been distributed to the user are displayed in the activity stream 404. Generally, the items 406, 408 displayed in the activity stream 404 include digital content that is distributed to the user from contacts established within the social networking service. A content sharing interface 410 can also be provided. The user can activate (e.g., click on) the content sharing interface 410 to share digital content. Although two items 406, 408 are depicted in FIG. 4, it is appreciated that the activity stream 400 can display any number of items to the user.

The items 406, 408 included in the activity stream 404 are posts that have been distributed to the user from other users of the social networking service (e.g., other users who are socially connected to the user). Posts in the activity stream can be retrieved automatically based on ACL's and affinity scores, for example. In addition to distributed posts, other types of digital content can made available to the user. For example, the user can view another user's social networking web page to access other digital content items. In some examples, the activity stream of other social network participants can be made accessible to the user. In some examples, image galleries, collections of videos, music and games, contact lists, and profile information (e.g., biographical information, subscriptions, and marital status) of other social network participants can be made accessible to the user. In some examples, the user can also access chat rooms (e.g., video or IM chat rooms) associated with other members of the social networking service. Other types or categories of appropriate digital content (e.g., web page recommendations and task lists) pertaining to other members of the social networking service can be made available to the user.

3. Privacy Settings

Privacy settings can be established to govern which digital content is made available to contacts of a user within a social networking service. In some examples, privacy settings can be established by a user through an appropriate GUI (as discussed in further detail below). In some examples, privacy settings can be used to create ACL's for particular items of digital content. As noted above, ACL's specify which users are granted access to particular items of digital content. For instance, in the illustrated example, the user of web page 400 can establish a privacy setting to limit which other users (or groupings of users) are granted access to the activity stream 404 (or individual posts in the activity stream 404). Different types of privacy settings can be provided. For example, some privacy settings are wide-ranging and apply to large groups of users (e.g., only "friends" are allowed to access the activity stream 404), while other privacy settings are more detailed (e.g., the particular contact "Katie" is allowed to access the activity stream 404). In some examples, a privacy setting can be both wide-ranging and detailed (e.g., only "friends" who are not "Katie" can access the activity stream). In some examples, privacy settings can be established for each category or type of digital content distributed or made available by the social networking service. For example, privacy settings can be established to regulate contact access to profile information of the user, photos shared by the user, music shared by the user, videos shared by the user and/or any other appropriate digital content made available by the user through the social networking service. In some implementations, the privacy settings can be arranged into sets and applied to groupings of social entities through an appropriate GUI, as discussed in further detail herein.

Implementations of the present disclosure are generally directed to establishing privacy settings. In some implementations, actions can include transmitting instructions to a client device to display a graphical user interface (GUI), receiving user input through the GUI, and applying a set of privacy settings (e.g., two or more privacy settings) to a grouping of social entities in response to the user input. In some examples, the GUI includes two or more privacy settings, a first privacy zone that is a graphical representation of a first set of privacy settings, a second privacy zone that is a graphical representation of a second set of privacy settings. The GUI also includes a privacy setting icon that is a graphical representation of a grouping of social entities. In some examples, the grouping of social entities includes a grouping of contacts of a user within the social networking service (e.g., social circles). In some examples, the user input defines placement, in the GUI, of the privacy setting icon within one of the first and second privacy zones.

Figure 5A:
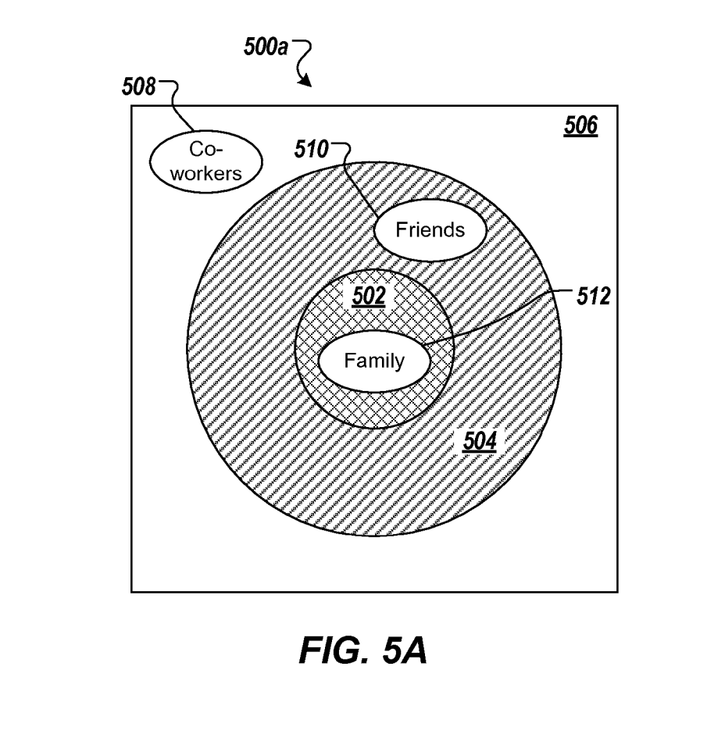
FIGS. 5A and 5B depict example interfaces for establishing privacy settings.
Figure 5B:
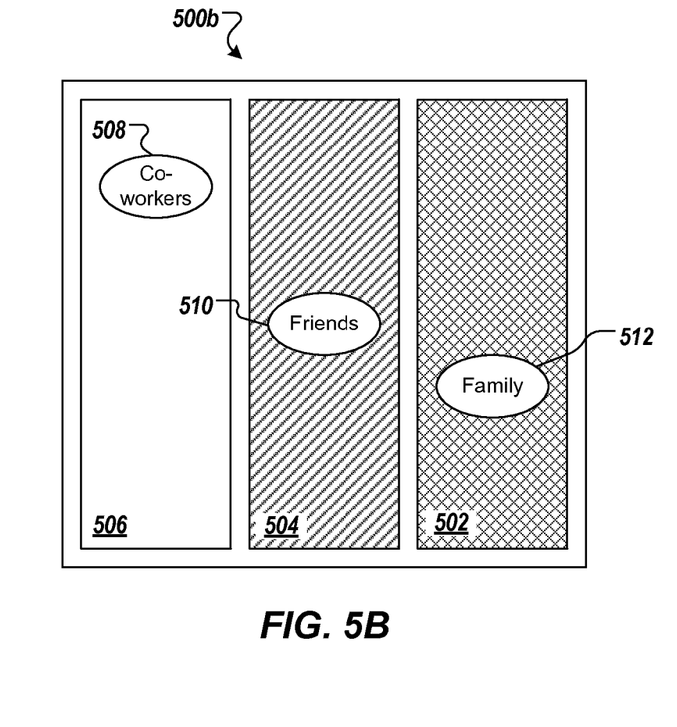

FIGS. 5A and 5B depict example interfaces for establishing privacy settings. In particular, FIG. 5A depicts an example GUI 500a and FIG. 5B depicts an example GUI 500b. In the depicted examples, each of the GUIs 500a, 500b includes privacy zones 502, 504, 506, as well as privacy setting icons 508, 510, 512. The privacy zones 502, 504, 506 are GUI elements that provide graphical representations of respective sets of privacy settings. The sets of privacy settings represented by the respective privacy zones 502, 504, 506 can be established by the user and/or automatically without user input. For example, a social networking server can establish default sets of privacy settings that can be modified by the user. The sets of privacy settings can be different from one another. In some examples, the sets of privacy settings can vary in the number of setting. For instance, the set of privacy settings represented by the privacy zone 506 can include a number of privacy settings that is greater or less than the number of privacy settings included in the sets of privacy settings represented by the privacy zones 502 and/or 504.

In some examples, the sets of privacy settings can vary in type. For example, if the set of privacy settings represented by the privacy zone 506 pertain to profile information and/or contact lists of the user within the social networking service, the sets of privacy settings represented by the privacy zones 502 and/or 504 can pertain to other types of digital content (e.g., collections of music and videos and/or activity streams and posts).

In some examples, the sets of privacy settings can vary in restrictiveness. For instance, the set of privacy settings represented by the privacy zone 506 can be more restrictive than the sets of privacy settings represented by the privacy zones 502 and 504. The restrictiveness of the sets of privacy settings can be determined based on the restrictiveness of individual privacy settings in the set. For example, consider that the sets of privacy settings represented by each privacy zone 502, 504, 506 include privacy settings pertaining to image galleries of the user. In one non-limiting example, the privacy setting of zone 502 allows uninhibited access to the image galleries, while the privacy setting of zone 504 allows limited access to particular groups of images within the image galleries and the privacy setting of zone 506 does not allow access to any of the images. The restrictiveness of the sets of privacy settings can also be determined based on the types of privacy settings included in the set and/or the number of privacy settings included in the set.

In some examples, the arrangement of the privacy zones within the GUI can correspond to the sets of privacy settings represented by the privacy zones. For example, with particular reference to FIG. 5A, the privacy zones 502, 504, 506 are arranged in the GUI 500a in a layered fashion. As shown, the privacy zone 502 is in an inner-most layer, the privacy zone 504 is in an intermediate layer, and the privacy zone 506 is in an outer-most layer. Accordingly, the privacy zone 502 can represent a set of privacy settings that is less restrictive than the settings of the privacy zones 504 and/or 506, the privacy zone 504 can represent a set of privacy settings that is less restrictive than the settings of the privacy zone 506, and the privacy zone 506 can represent the most restrictive set of privacy settings. In some examples, the layered privacy zones are hierarchical, such that the set of privacy settings represented by an inner layer privacy zone includes the privacy settings represented by an outer layer privacy zone. For example, referring again to FIG. 5A, the set of privacy settings represented by the privacy zone 506 can include the privacy settings represented by both of the privacy zones 502 and 504.

Referring now to FIG. 5B, the privacy zones 502, 504, 506 are arranged in the GUI 500b in a progressive order with respect to restrictiveness. Accordingly, the privacy zone 502 represents the least restrictive set of privacy settings and the privacy zone 506 represents the most restrictive set of privacy settings.

In some examples, the size of the privacy zones within the GUI can correspond to the sets of privacy settings represented by the privacy zones. For example, with particular reference to FIG. 5A, the privacy zone 502, which represents the least restrictive set of privacy settings, is provided in the GUI 500a as the visually smallest privacy zone. The privacy zone 506 which represents the most restrictive set of privacy settings is provided in the GUI 500a as the visually largest privacy zone.

The privacy setting icons 508, 510, 512 are GUI elements that provide graphical representations of respective groupings of social entities. In some examples, the social entities can include members of the social networking service that are socially connected to a particular user (i.e., that are contacts of the particular user within the social networking service). For example, the groupings of social entities can correspond to contact lists and/or social circles maintained by the user through the social networking service. The social entities can also include organizations or businesses with social networking identities. In the illustrated example, the privacy setting icon 508 represents a grouping of social entities prescribed by the user's social circle "Co-workers"; the privacy setting icon 510 represents a grouping of social entities prescribed by the user's social circle "Friends"; and the privacy setting icon 512 represents a grouping of social entities prescribed by the user's social circle "Family".

Placement of the privacy setting icon 508, 510, 512 within the GUI 500a, 500b can define the privacy settings that are applied to the representative groupings of social entities. For example, as shown in FIGS. 5A and 5B, the privacy setting icon 508 is placed within the privacy zone 506. Consequently, the set of privacy settings representing by the privacy zone 506 can be applied to the grouping of social entities represented by the privacy setting icon 508 (e.g., to contacts that are in the "Co-workers" social circle).

In some examples, the application of privacy settings can be "refreshed." For instance, if the grouping of social entities represented by the privacy setting icon 508 is modified (e.g., by adding or subtracting a member of the grouping), the privacy settings can be re-applied to the modified grouping of social entities. This can include resetting or deleting ACLs corresponding to the various privacy settings of the set and recreating them based on the modified grouping of social entities. Similarly, the application of privacy settings can be refreshed in response to a modification of the privacy zones.

In some examples, a privacy setting icon can be placed in more than one privacy zone. For instance, a privacy setting icon can be positioned in the GUI such that a first portion of the privacy setting icon is in one privacy zone and a second portion of the privacy setting icon is in an adjacent privacy zone. Privacy settings applied to the one or more contacts represented by the privacy setting icon can include some, or all, of the privacy settings represented by both of the privacy zones.

GUIs can be displayed on a client computing device, such that a user associated with the computing device can alter the placement of the privacy setting icon 508, 510, 512. For example, conventional techniques such as the "drag-and-drop" technique can be employed by a user to alter the placement of the privacy setting icons. Placement of the privacy setting icons in the GUI can be received as user input by a social networking server. The user input can be provided to the social networking server as data. In some examples, the data is provided in the form of an appropriate designator identifying the privacy zone(s) in which the privacy setting icon is placed. The data can also be provided as coordinates mapped to pixels of the GUI.

Although the GUIs shown in the illustrated examples include three privacy zones, any suitable number of privacy zones can be provided (e.g., two or more). In some examples, the user can alter the number of privacy zones. For instance, as discussed above in relation to the sets of privacy settings, the social networking server can provide a default collection of privacy zones that can be customized by the user.

As noted above, each privacy zone represents a set of privacy settings. In some examples, each privacy setting in a set of privacy settings can be associated with a category or type of digital content. In some examples, digital content can include user profile information, user post streams, images, videos, music, video games, user contacts and/or any other appropriate digital content. In some examples, each set of privacy settings can account for each category of digital content and can include tailored privacy settings. By way of non-limiting example, a first set of privacy settings and a second set of privacy settings can each include privacy settings for user profile information, user post streams, images, videos, music, video games and user contacts, and each privacy setting can include a binary setting (e.g., show or hide). Continuing with the non-limiting example, the first set of privacy settings (e.g., privacy settings associated with the privacy zone 502) can be provided as:

user profile information=show
user post streams=show
images=show
videos=show
music=show
video games=show
user contacts=show and the second set of privacy settings (e.g., privacy settings associated with the privacy zone 506) can be provided as:

user profile information=hide
user post streams=hide
images=hide
videos=hide
music=hide
video games=hide
user contacts=hide Consequently, the first set of privacy settings are less restrictive than the second set of privacy settings.

Continuing with the non-limiting example, if the user places a privacy setting icon within a privacy zone associated with the first set of privacy settings (e.g., places the privacy setting icon 512 within the privacy zone 502), the access that each contact represented by the privacy setting icon is governed by the first privacy settings. In this case, each contact has access to user profile information, user post streams, images, videos, music, video games and user contacts. If the user places a privacy setting icon within a privacy zone associated with the second set of privacy settings (e.g., places the privacy setting icon 508 within the privacy zone 506), the access that each contact represented by the privacy setting icon is governed by the second privacy settings. In this case, no contacts have access to user profile information, user post streams, images, videos, music, video games or user contacts.

In some implementations, categories of digital content can include sub-categories. For example, user profile information can include sub-categories (e.g., home address information, telephone number, email address, education information, employment history). A privacy setting can be provided for each sub-category.

In some examples, a contact can be included in multiple groupings of social entities. By way of non-limiting example, a contact can be included in a first grouping of social entities (e.g., in the "Family" social circle represented by the privacy setting icon 512) and can be included in a second grouping of social entities (e.g., in the "Co-workers" social circle represented by the privacy setting icon 508). In some examples, the privacy settings imparted to the contact can include the least restrictive privacy settings.

Example Process

Figure 6:
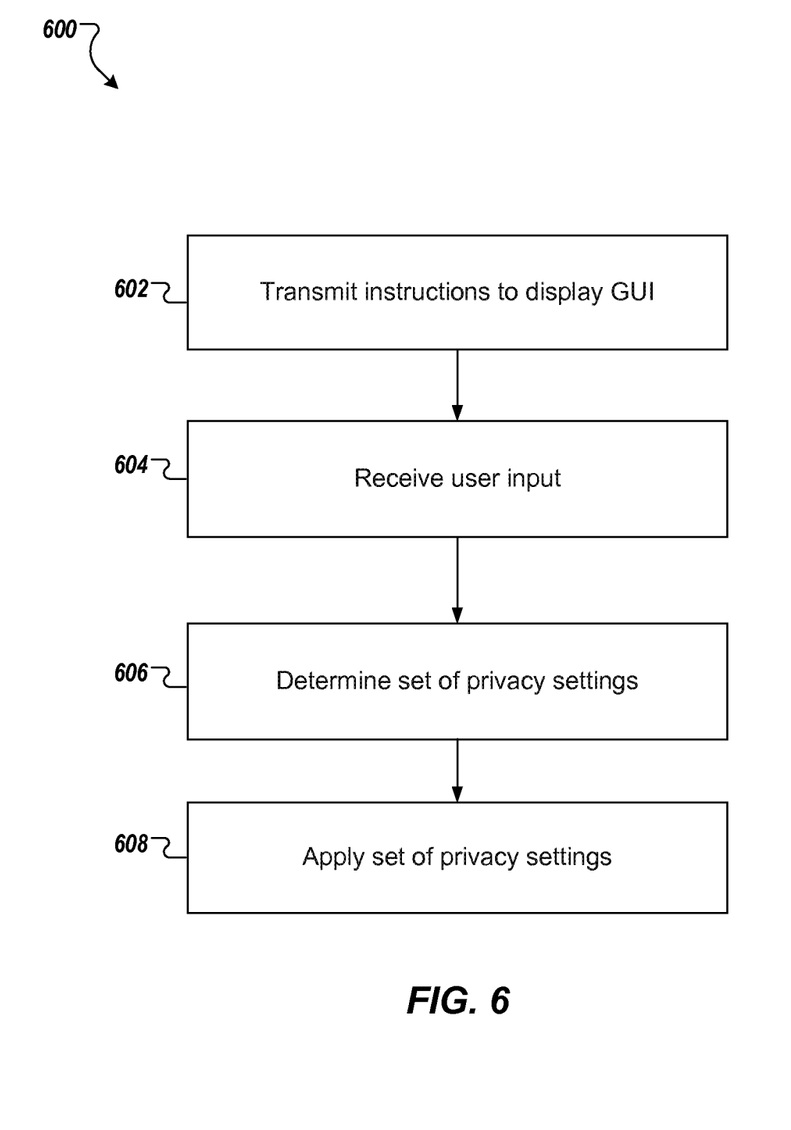
FIG. 6 is a flowchart of an example process that can be executed in implementations of the present disclosure.

FIG. 6 is a flowchart of an example process 600 that can be executed in implementations of the present disclosure. In some implementations, the example process 600 can include operations that are performed using one or more computer programs executed using one or more data processing apparatus (e.g., one or more client-side computing devices and/or one or more server-side computing devices). The example process 600 can be executed to establish privacy settings for user data within a social networking service.

Instructions to display a GUI are transmitted (602). For example, a social networking server (e.g., the server system 112 of FIG. 1) can transmit instructions to a client computing device associated with a user (e.g., any one of the client devices 102-110 of FIG. 1). The instructions can be executed by the client device 102 to display a GUI for establishing privacy settings in a social networking environment to the user. The GUI can include a first privacy zone representative of a first set of privacy settings, a second privacy zone representative of a second set of privacy settings, and a privacy setting icon representative of a grouping of social entities. For example, the instructions can be executed by the client device 102 to display the GUI 500a (or the GUI 500b). As discussed above, the GUI 500a includes multiple privacy zones (e.g., the privacy zones 502, 504, and 506), with each of the multiple privacy zones representing a distinct and respective set of privacy settings. The GUI 500a also includes multiple privacy setting icons (e.g., the privacy setting icons 508, 510, and 512), with each of the multiple privacy setting icons representing a distinct and respective grouping of social entities. User input can be received (604). For example, a user associated with client device 102 can provide user input by interacting with the GUI 500a displayed on the client device 102. As one example of user interaction with the GUI 500a, the user can establish a location of the privacy setting icons 508, 510, and 512 in the GUI 500a with respect to the privacy zones 502, 504, and 506. The user can, for example, employ a drag-and-drop technique through a user interface of the client device 102 to move and place each of the privacy setting icons 508, 510, and 512 within a desired one of the privacy zones 502, 504, and 506. In response to the user interaction with the GUI 500a (or in response to an appropriate user command), the client device 102 can communicate the user input to the server system 112. Based on the user input, privacy settings to be applied to one or more contacts associated with the grouping of social entities are determined (606). For instance, as one non-limiting example, the server system 112 can assign, to each contact included in a social entity grouping represented by a particular privacy setting icon, the set of privacy settings represented by a privacy zone in which the particular privacy setting icon was placed by the user. Access to the one or more contacts to digital content can be controlled based on the privacy settings (608). For example, the server system 112 can process the privacy settings to generate appropriate ACLs that are assigned to digital content authored by the user. The server system can control access to the digital content based on the ACLs.

4. Example Embodiments

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. In some examples, actions of a server can be executed in a distributed system, a multi-processor system, and/or one or more virtual machines operating over a distributed architecture, such as a cloud.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A computer-implemented method executed using one or more computing devices, the method comprising:
    transmitting, using the one or more computing devices, instructions to display a graphical user interface (GUI), the GUI comprising:
        two or more privacy zones, wherein the two or more privacy zones comprise a first privacy zone provided as a graphical representation of a first set of privacy settings and a second privacy zone as a graphical representation of a second set of privacy settings, and
        a first privacy setting icon as a graphical representation of a first grouping of social entities, the first grouping of social entities comprising one or more contacts within a social networking service;
    receiving, at the one or more computing devices, first user input, the first user input defining a location of the first privacy setting icon by repositioning the first privacy setting icon to the first privacy zone from the second privacy zone without changing a location of a second privacy setting icon that is a graphical representation of a second grouping of social entities, wherein the second grouping is not identical to the first grouping; and
    determining privacy settings to be applied to each of the one or more contacts of the first grouping of social entities graphically represented by the first privacy setting icon, based on the location of the first privacy setting icon within at least one of the first and second privacy zones, and
    controlling, using the one or more computing devices, access of each of the one or more contacts of the first grouping of social entities to digital content based on the privacy settings determined based on the location of the first privacy setting icon,
    wherein the repositioning comprises repositioning the first privacy setting icon on a border between the first privacy zone and the second privacy zone, and
    wherein the controlling access comprises controlling access of the one or more contacts of the first grouping to digital content, based on the first set of the privacy settings and the second set of privacy settings.

2. The method of claim 1, wherein privacy settings of the first set of privacy settings are different from privacy settings of the second set of privacy settings.

3. The method of claim 1, wherein each privacy setting of the first set of privacy settings and the second set of privacy settings is associated with a category of digital content.

4. The method of claim 1, wherein the digital content comprises digital content associated with a user of the social networking service.

5. The method of claim 4, wherein the user input is provided by the user.

6. The method of claim 1, wherein the two or more privacy zones comprise three or more privacy zones graphically representing three distinct sets of privacy settings, respectively.

7. The method of claim 1, wherein the first set of privacy settings is less restrictive than the second set of privacy settings.

8. The method of claim 7, wherein the first set of privacy settings and the second set of privacy settings are associated with a plurality of digital content categories.

9. The method of claim 1, wherein a spatial relationship between the first privacy zone and the second privacy zone corresponds to a relative restrictiveness between the first set of privacy settings and the second set of privacy settings.

10. The method of claim 1, wherein a size relationship between the first privacy zone and the second privacy zone corresponds to a relative restrictiveness between the first set of privacy settings and the second set of privacy settings.

11. The method of claim 1, wherein controlling access of the one or more contacts to digital content based on at least one of the first and second privacy settings comprises generating at least one access control list (ACL) relating to the digital content.

12. The method of claim 1, further comprising:
    transmitting instructions to display the second privacy setting icon, the second grouping of social entities comprising one or more contacts within the social networking service;
    receiving second user input, the second user input defining a location of the second privacy setting icon within at least one of the first and second privacy zones; and
    in response to the location of the second privacy setting icon within the at least one of the first and second privacy zones, controlling access of the one or more contacts of the second grouping of social entities to digital content based on at least one of the first and second sets of privacy settings.

13. A non-transitory computer storage media encoded with one or more computer programs, the one or more computer programs comprising instructions that when executed by data processing apparatus cause the data processing apparatus to perform operations comprising:
    transmitting, using the one or more computing devices, instructions to display a graphical user interface (GUI), the GUI comprising:
        two or more privacy zones, wherein the two or more privacy zones comprise a first privacy zone provided as a graphical representation of a first set of privacy settings and a second privacy zone as a graphical representation of a second set of privacy settings, and a first privacy setting icon as a graphical representation of a first grouping of social entities, the first grouping of social entities comprising one or more contacts within a social networking service;

receiving, at the one or more computing devices, first user input, the first user input defining a location of the first privacy setting icon by repositioning the first privacy setting icon to the first privacy zone from the second privacy zone without changing a location of a second privacy setting icon that is a graphical representation of a second grouping of social entities, wherein the second grouping is not identical to the first grouping; and determining privacy settings to be applied to each of the one or more contacts of the first grouping of social entities graphically represented by the first privacy setting icon, based on the location of the first privacy setting icon within the at least one of the first and second privacy zones and, controlling, using the one or more computing devices, access of each of the one or more contacts of the first grouping of social entities to digital content based on the privacy settings determined based on the location of the first privacy setting icon, wherein the repositioning comprises repositioning the first privacy setting icon on a border between the first privacy zone and the second privacy zone, and wherein the controlling access comprises controlling access of the one or more contacts of the first grouping to digital content, based on the first set of the privacy settings and the second set of privacy settings.

14. A system comprising:

one or more computing devices; and a computer-readable medium coupled to the one or more computing devices and having instructions stored thereon which, when executed by the one or more computing devices, cause the one or more computing devices to perform operations comprising:

transmitting, using the one or more computing devices, instructions to display a graphical user interface (GUI), the GUI comprising:

two or more privacy zones, wherein the two or more privacy zones comprise a first privacy zone provided as a graphical representation of a first set of privacy settings and a second privacy zone as a graphical representation of a second set of privacy settings, and a first privacy setting icon as a graphical representation of a first grouping of social entities, the first grouping of social entities comprising one or more contacts within a social networking service;

receiving, at the one or more computing devices, first user input, the first user input defining a location of the first privacy setting icon by repositioning the first privacy setting icon to the first privacy zone from the second privacy zone without changing a location of a second privacy setting icon that is a graphical representation of a second grouping of social entities, wherein the second grouping is not identical to the first grouping; and determining privacy settings to be applied to each of the one or more contacts of the first grouping of social entities graphically represented by the first privacy setting icon, based on the location of the first privacy setting icon within the at least one of the first and second privacy zones, and controlling, using the one or more computing devices, access of each of the one or more contacts of the first grouping of social entities to digital content based on the privacy settings determined based on the location of the first privacy setting icon, wherein the repositioning comprises repositioning the first privacy setting icon on a border between the first privacy zone and the second privacy zone, and wherein the controlling access comprises controlling access of the one or more contacts of the first grouping to digital content, based content, based on the first set of the privacy settings and the second set of privacy settings.

15. The method of claim 1, the repositioning comprising dragging the first privacy setting icon from the first privacy zone to the second privacy zone, and dropping the first privacy setting icon within the second privacy zone.

16. The method of claim 1, the repositioning comprising repositioning the first privacy setting icon to be in the first privacy zone such that both the first privacy setting icon and the second privacy setting icon are both positioned in the first privacy zone.

* * * * *